United States Patent
Malmberg et al.

(10) Patent No.: US 8,944,673 B2
(45) Date of Patent: Feb. 3, 2015

(54) HOMOGENIZER VALVE

(75) Inventors: Rolf Malmberg, Lund (SE); Jozo Valencuk, Dalby (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 1162 days.

(21) Appl. No.: 12/864,470

(22) PCT Filed: Dec. 9, 2008

(86) PCT No.: PCT/SE2008/000688
§ 371 (c)(1),
(2), (4) Date: Sep. 8, 2010

(87) PCT Pub. No.: WO2009/096825
PCT Pub. Date: Aug. 6, 2009

(65) Prior Publication Data
US 2010/0329073 A1    Dec. 30, 2010

(30) Foreign Application Priority Data
Jan. 29, 2008    (SE) .................................... 0800208

(51) Int. Cl.
*B01F 5/08*    (2006.01)
*A01J 11/16*   (2006.01)
*B01F 5/06*    (2006.01)

(52) U.S. Cl.
CPC . *B01F 5/08* (2013.01); *A01J 11/16* (2013.01); *B01F 5/0665* (2013.01); *B01F 5/068* (2013.01); *B01F 5/0681* (2013.01)
USPC .......................................... 366/176.2; 138/43

(58) Field of Classification Search
USPC ..................... 366/176.1–176.4; 137/803–842; 138/42–43
See application file for complete search history.

(56) References Cited

U.S. PATENT DOCUMENTS

| | | | | |
|---|---|---|---|---|
| 2,435,884 A | * | 2/1948 | Galewski | 366/136 |
| 3,226,029 A | * | 12/1965 | Goodman et al. | 239/4 |
| 3,473,787 A | * | 10/1969 | Bartlett | 366/176.2 |
| 4,352,573 A | | 10/1982 | Pandolfe | |
| 4,585,357 A | * | 4/1986 | Ogata | 366/176.2 |
| 5,749,650 A | * | 5/1998 | Kinney et al. | 366/176.2 |

(Continued)

FOREIGN PATENT DOCUMENTS

| | | |
|---|---|---|
| EP | 0 034 675 A2 | 9/1981 |
| JP | 61-028429 A | 2/1986 |
| SE | 509 103 | 12/1998 |

OTHER PUBLICATIONS

International Search Report (PCT/ISA/210) issued on Mar. 26, 2009 by Swedish Patent Office as the International Searching Authority for International Application No. PCT/SE2008/000688.

*Primary Examiner* — Charles Cooley
(74) *Attorney, Agent, or Firm* — Buchanan Ingersoll & Rooney P.C.

(57) ABSTRACT

A homogenizer valve includes two or more pressurized, movable valve cones, two or more valve seats and a valve housing which surrounds the valve cones and the valve seats. The valve cones and the valve seats are disposed so that throttles occur between them, which constitute homogenization gaps, which have a gap height h. The homogenization gaps are disposed at an angle in relation to the horizontal plane. The homogenizer valve is intended to be used in existing homogenizers and has been particularly produced to be able to obtain an efficient homogenization for liquids which are processed at a lower pressure and with a greater flow, such as, for example, pasteurized milk.

17 Claims, 3 Drawing Sheets

(56) References Cited

U.S. PATENT DOCUMENTS

| | | | |
|---|---|---|---|
| 5,899,564 A * | 5/1999 | Kinney et al. | 366/176.2 |
| 6,234,206 B1 * | 5/2001 | Malmberg et al. | 137/625.33 |
| 6,238,080 B1 * | 5/2001 | Jarchau | 366/176.2 |
| 6,244,739 B1 * | 6/2001 | Jarchau et al. | 366/176.2 |
| 6,305,836 B1 * | 10/2001 | Jarchau | 366/176.2 |
| 6,502,979 B1 * | 1/2003 | Kozyuk | 366/176.2 |
| 6,705,755 B1 * | 3/2004 | Innings et al. | 366/176.1 |
| 6,802,639 B2 * | 10/2004 | Kozyuk | 366/176.2 |
| 7,086,777 B2 * | 8/2006 | Kozyuk | 366/176.2 |
| 7,314,306 B2 * | 1/2008 | Kozyuk | 366/176.2 |
| 8,066,425 B2 * | 11/2011 | Boer et al. | 366/176.2 |
| 8,568,019 B2 * | 10/2013 | Waldron et al. | 366/181.5 |
| 8,585,277 B2 * | 11/2013 | Grandi et al. | 366/176.2 |
| 2006/0193199 A1 * | 8/2006 | Kozyuk | 366/176.2 |
| 2009/0141584 A1 * | 6/2009 | Boer et al. | 366/336 |
| 2010/0296363 A1 * | 11/2010 | Grandi et al. | 366/176.3 |
| 2010/0329073 A1 * | 12/2010 | Malmberg et al. | 366/176.3 |
| 2014/0177382 A1 * | 6/2014 | Malmberg et al. | 366/176.2 |

* cited by examiner

# HOMOGENIZER VALVE

TECHNICAL FIELD

The present invention relates to a homogenizer valve comprising a pressurised, movable valve cone, a valve seat and a valve housing surrounding the valve cone and the valve seat, said valve cone and said valve seat being so disposed that there occurs a throttle between them, the throttle constituting a homogenization gap.

BACKGROUND ART

Homogenization is an industrial process which has been used for a considerable length of time, and its purpose is, in a fat emulsion such as, for example, milk, to split the largest fat globules into smaller fat globules and by such means stabilize the fat emulsion. For, for example milk, this implies that cream setting is prevented, and the vast majority of all consumer milk today is homogenized.

Homogenization normally takes place by mechanical processing, so that the fat emulsion which has a high input pressure is forced at high speed to pass through a very narrow gap, where the fat globules of the fat emulsion are broken up as a result of the turbulence which occurs at great speeds and through cavitation bubbles which implode in the liquid. The process takes place during an extremely short period of time and what happens during this period of time is that the speed of the fat emulsion on passage increases while the pressure decreases, with the result that the liquid begins to boil.

A homogenizer consists essentially of a large piston pump which delivers a high pressure, as well as a counter-pressure device where the homogenization proper takes place. The counter-pressure device, or homogenizer valve, in turn consists of a pressurized, resilient valve cone, a valve seat as well as a wear ring or gasket and a valve housing surrounding the valve cone and valve seat. The valve cone and valve seat are normally rotation-symmetrical and are disposed such that there occurs between these two parts a radial throttle, which constitutes a homogenization gap. The height, width and length of the gap determine that volume at which the homogenization takes place. This volume must be sufficiently small to obtain an efficient homogenization. The gap height is reduced at a higher pressure on the liquid which is to be homogenized, at the same time as a larger flow entails that the gap height is increased.

Above all in the homogenization of pasteurized milk, compared with UHT treated milk (Ultra High Temperature), use is made of a lower pressure at the same time as the intention is to increase the flow quantity. This implies that the homogenizer valve would need to be made larger, so that the gap height is reduced, in order to obtain a good level of homogenization at this lower pressure and increased flow. However, it has proved that an up-scaling of existing, well functioning homogenizer valves not always functions satisfactorily in practice. The larger the pressurized surface, the greater the forces will be that arise and the larger the homogenizer valve. Simultaneously, the costs for such a homogenizer valve increase by several factors.

Another method of solving problem is to connect in parallel a number of homogenizer gaps, as shown in European Patent Specification EP 034 675. By such means, there will be obtained an extension of the gap length and thereby a reduction of the gap height. This type of homogenizer valve with homogenization gaps connected in parallel has, however, an as good as fixed gap height. It permits only one flow and one homogenization pressure without retro-structuring. It also suffers from the drawback of wear in an uneven and uncontrollable manner, which harmfully affects the homogenization result.

Swedish Patent Specification SE 509 103 discloses yet a further solution to how the gap length can be extended by up to three times. This takes place by designing the valve seat and the valve cone so that a plurality of concentric homogenization gaps occurs. This homogenizer valve may be regulated for different flows.

OBJECTS OF THE PRESENT INVENTION

One object of the present invention is to realise a homogenizer valve which offers great possibilities to be regulated in gap length at the same time as a lower gap height is obtained. The homogenization gap has a slight gap height at high capacity and a low homogenization pressure.

A further object of the present invention is that the gap height may be regulated when pressure and flow vary.

Yet a further object of the present invention is that the homogenizer valve is more economical to manufacture and that it displays improved properties as regards wear than prior art valve solutions.

Still a further object of the present invention is that the homogenization pressure may readily be adjusted, even after a certain wear.

Still a further object of the present invention is that the homogenizer valve permits an efficient cleaning and otherwise satisfies the extremely stringent requirements of food handling.

SOLUTION

These and other objects have been attained according to the present invention in that the homogenizer valve of the type described by way of introduction has been given the characterising features that two or more valve cones are superposed on one another and that two or more valve seats are superposed on one another, so that two or more homogenization gaps occur.

Preferred embodiments of the present invention have further been given the characterising features as set forth in the appended subclaims.

BRIEF DESCRIPTION OF THE ACCOMPANYING DRAWINGS

One preferred embodiment of the present invention will now be described in greater detail hereinbelow, with reference to the accompanying Drawings. In the accompanying Drawings.

The Drawings show only those details essential to an understanding of the present invention, and the positioning of the homogenizer valve in the homogenizer, which is well-known to the skilled reader of this specification, has been omitted.

DESCRIPTION OF PREFERRED EMBODIMENT

Figure 1:
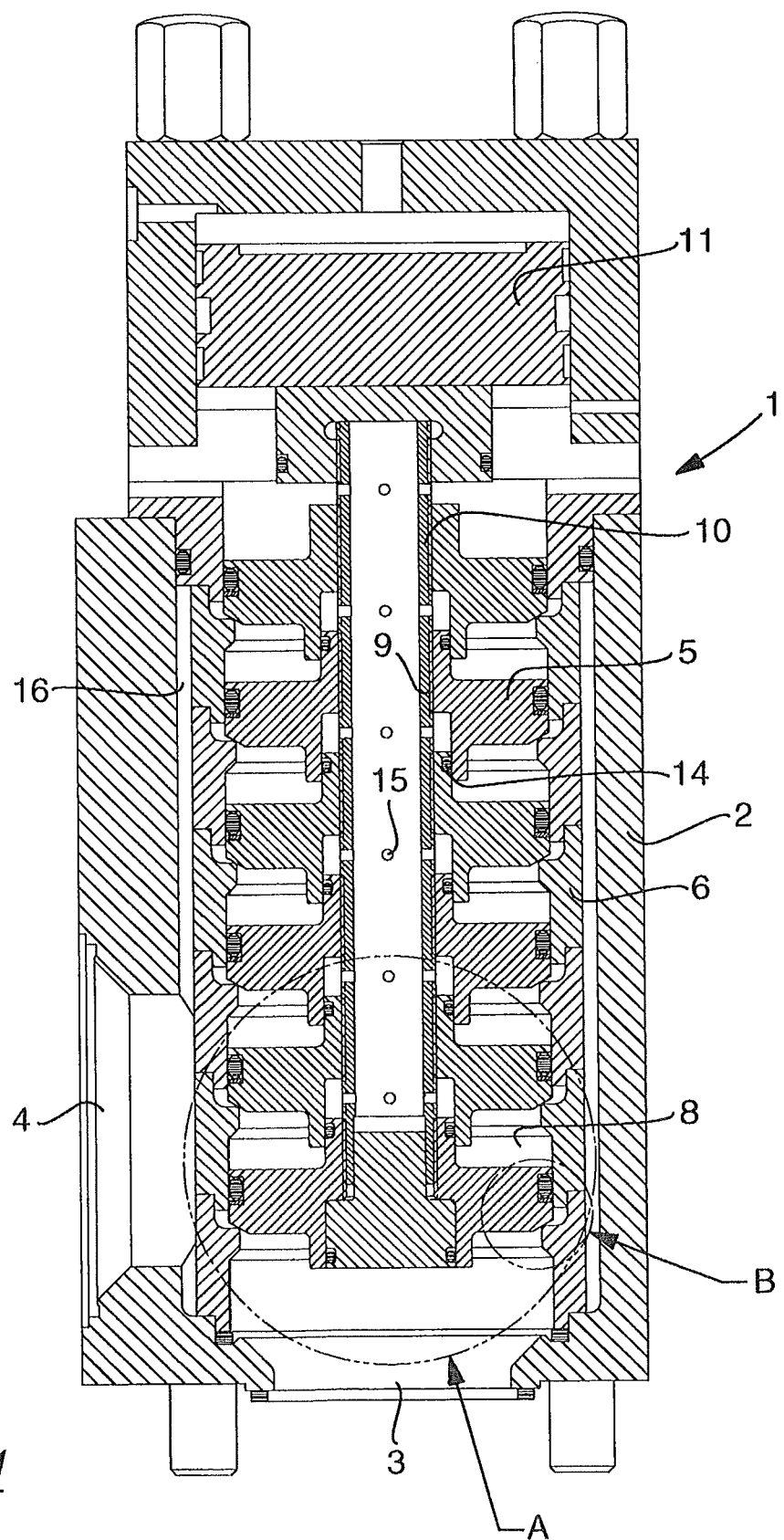
FIG. 1 shows, partly in section, a side elevation of the apparatus according to the invention.
Figure 1A:
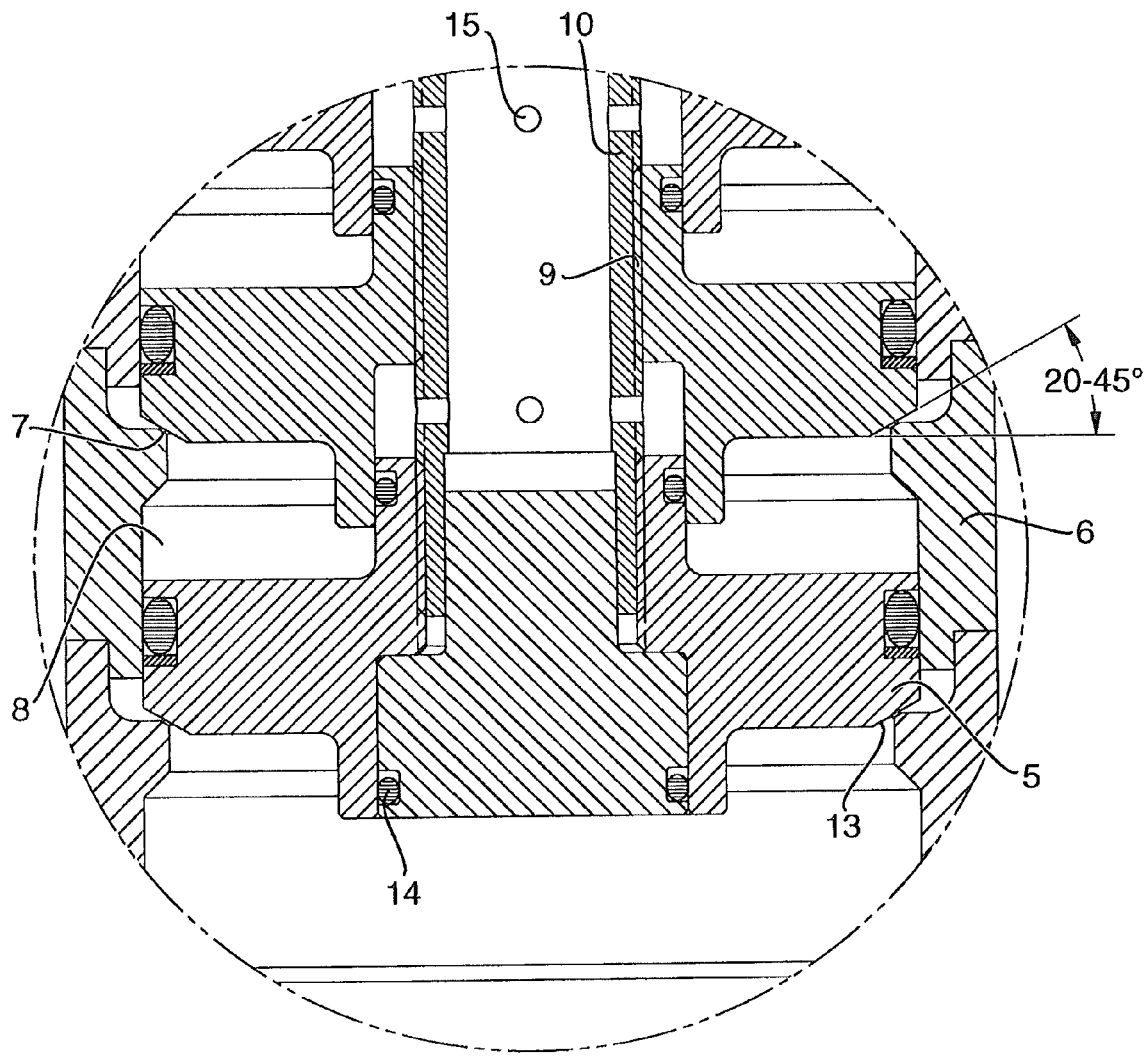
FIG. 1A shows, partly in section, a magnified part of FIG. 1.
Figures 1B, 2:
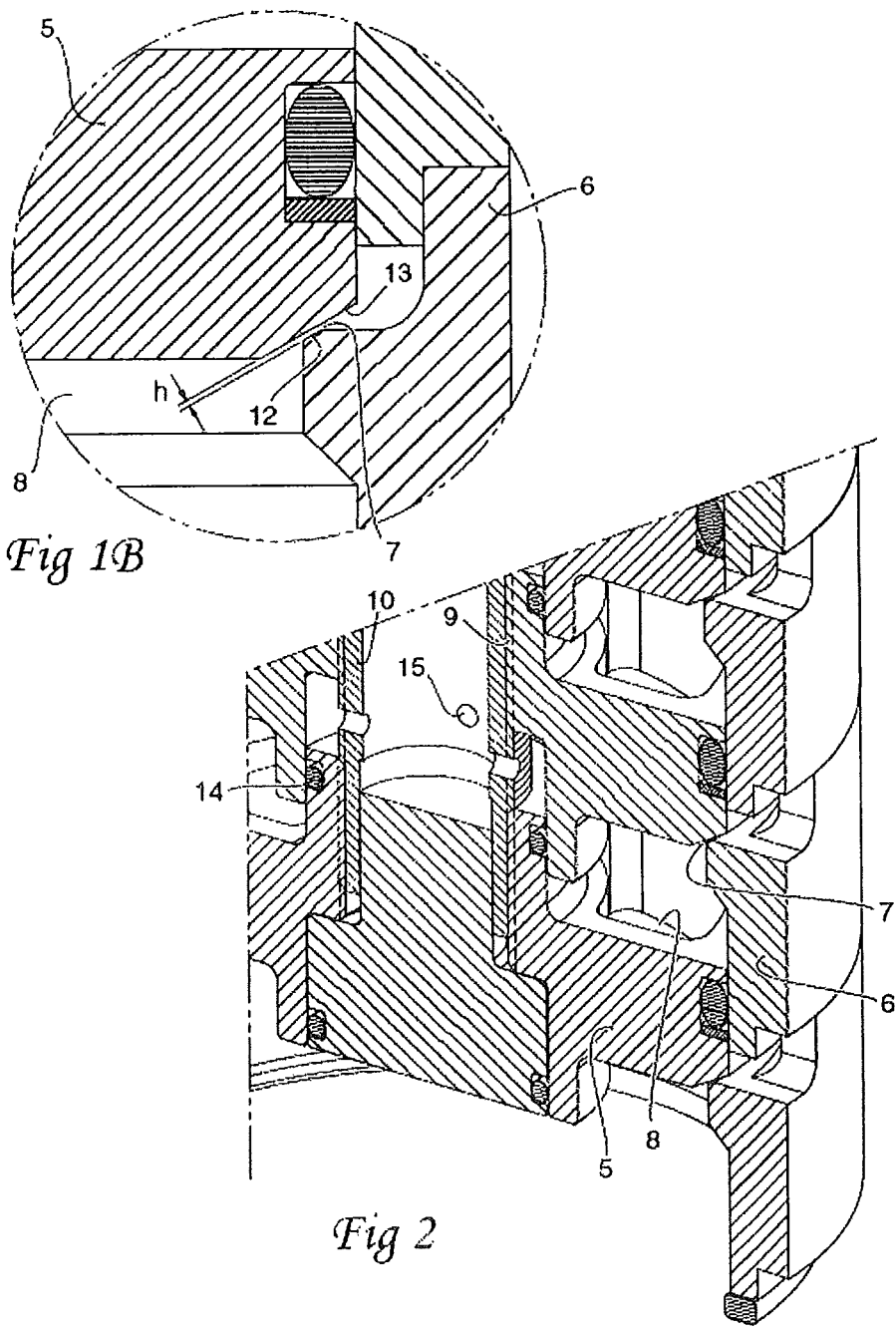
FIG. 1B shows, partly in section, yet a further magnified part of FIG. 1.
FIG. 2 is a perspective view of a part of the apparatus according to the invention.

A homogenizer valve 1 according to the present invention, as illustrated in FIG. 1, consists substantially of a valve housing 2 with an inlet 3 and an outlet 4 for the liquid which is to be homogenized, as well as a plurality of valve cones 5 and a plurality of valve seats 6. The valve cones 5 and the valve seats 6 are disposed such that there occur throttles between them, homogenization gaps 7.

In the preferred embodiment, the valve seats 6 are rotational-symmetric and have a central through flow channel 8 for the liquid which is to be homogenized, constituting an extension of the inlet 3 of the homogenizer valve 1. The valve seats 6 are superposed on one another and they are secured to the valve housing 2.

The valve seats 6 further display a bevel 12. The bevel 12 is turned to face towards the centre of the homogenizer valve 1. The bevel 12 is turned to face away from the inlet 3 of the homogenization valve 1. The bevel is between 20 and 45°, preferably 30° in relation to the horizontal plane. The valve seats 6 are preferably manufactured from surface treated, stainless steel, but other food approved materials may also occur.

The valve cones 5, which are also rotation-symmetrical, have a threaded surface 9 towards the centre of the homogenization valve 1. In the centre of the homogenizer valve 1 there is disposed a threaded rod 10 whose threads interlock in the threaded surfaces 9 on the valve cones 5. The meshed portions are sealed off, by means of hygienic seals 14 of O-ring type, from the product which passes through the central through-flow channel 8. The threaded rod 10 has, adjacent the seals 14, bleeder holes 15. The bleeder holes 15 may, in addition to being employed as bleeder route, also be used for indicating leakage if damage were to occur to the seals 14. In that the seals 14 are hygienic, there will be created a hygienic homogenizer valve 1 which satisfies the requirements of the food industry and which can be cleaned using conventional equipment.

The valve cones 5 have a bevel 13 towards the centre of the homogenizer valve 1. The bevel 13 is turned to face towards the inlet 3 of the homogenizer valve 1. The bevel is between 20 and 45°, preferably 30° in relation to the horizontal plane. The valve cones 5 are preferably manufactured from surface treated, stainless steel, but other food approved materials may also occur.

The valve cones 5, threaded together with the threaded rod 10, are pressurized, normally by means of an hydraulic or pneumatic piston 11, but may, in simpler versions, be pressurized by a set screw or grub screw which acts via a spring. The valve cones 5 are also movable, for example by the intermediary of the oil in the cylinder, in order to be able to take up the rapid flow variations which occur in the liquid which is to be homogenized. This elasticity is necessary in order to meet the flow variations which naturally occur in piston pumps.

The valve cones 5 and the threaded rod 10 are positioned in the valve housing 2 such that there occur, between the bevel 13 of the valve cones 5 and the bevel 12 of the valve seats 6, homogenization gaps 7 of a height h. The height h of the homogenization gap 7 may be varied with a varied pressure and flow, in that the valve cones 5 are moved more proximal to or more distal from the valve seats 6. In that the valve cones 5 are threaded on the threaded rod 10, it is possible to obtain exactly the same height h of all homogenization gaps 7 in the homogenizer valve 1.

The bevel 13 on the valve cones 5 is of a greater extent than the bevel 12 on the valve seats 6. The valve cones 5 are placed against the valve seats 6 so that there will be obtained projecting surfaces of the bevel 13 on both sides of the bevel 12. The homogenization gap 7 should not be too short, since increased wear may then be the result. A short homogenization gap 7 may also cause vibrations and disruptive noise.

As seen in the figures, each of the valve cones 5 has an outer dimension greater than the inner dimension of the associated valve seat 6, thereby the valve cones 5 and the associated valve seats 6 radially overlap one another to define the homogenization gap 7.

In the valve housing 2 of the homogenizer valve 1 there are disposed a number of valve cones 5 and a number of valve seats 6. FIG. 1 shows six valve cones 5 and six valve seats 6. As a result, there will be obtained six homogenization gaps 7 superposed on one another. A homogenizer valve 1 according to the present invention may contain both more and fewer valve cones 5 and valve seats 6, depending upon the desired capacity and practical application. By manufacturing the valve housing 2 in parts, it is possible in a simple manner to assemble more or fewer valve cones 5 and valve seats 6, respectively.

The liquid, normally milk, which is to be homogenized is led into the homogenizer where it is pressurized to approx. 10-25 Mpa. The milk normally has a fat content of 0.5-3.5% and is at a temperature of 55-80° C.

The liquid is led in through the inlet 3 and passes through the through-flow channel 8. Thereafter, the liquid passes one of the different homogenization gaps 7, where the homogenization takes place. The liquid is thereafter accumulated in the channels 16. Since the liquid always strives to take the simplest route, there will be a relatively uniform distribution of liquid through the different homogenization gaps 7. After the homogenization, the liquid passes out of the homogenizer valve 1, through the outlet 4. In that the homogenization gaps 7 are angled at 20-45°, preferably 30° in relation to the horizontal plane, there will be obtained a more uniform flow of the product, as well as reduced inlet losses on homogenization.

The gap height h is normally 50-200 µm. In the passage, an extremely rapid pressure drop is obtained down towards 0 Mpa, at the same time as the flow rate of the liquid increases, which results in the liquid beginning to boil. When the liquid leaves the gap 7, the flow rate is reduced and the pressure once again increases. The liquid ceases to boil and the steam bubbles in the liquid implode. The entire process takes place within a few fractions of a second and, in the violent process where the high flow rate gives rise to turbulence and cavitation, the fat globules which are in the liquid will be split into smaller particles.

By obtaining a uniform distribution of the liquid between the different homogenization gaps 7, there will be optimum utilisation of the increased gap length and a homogenizer with a homogenizer valve 1 according to the present invention can handle several times as great a flow as a conventional homogenizer valve. At the same time, the homogenizer valve is governable for variations in the product flow, in that the piston 11 may displace the valve cones 5 in relation to the valve seats 6 and thereby realise a different height h of the homogenization gap 7. In that the valve cones 5 are threaded on the threaded rod 10, all of the homogenization gaps 7 will have the same gap height h. All valve cones 5, as well as the threaded rod 10, are regulated as a unit, so that all of the homogenization gaps 7 always have the same gap height h.

As will have been apparent from the foregoing description, the present invention realises a homogenizer valve which may be employed for retrofitting in existing homogenizers, but which can handle a several times larger flow than a corresponding, conventional homogenizer valve. At the same time, the homogenizer valve may be regulated for instantaneous variations in pressure and flow. In that the homogenizer valve can be regulated, it also displays superior properties in respect of wear than prior art homogenizer valves. As a result of the design of the homogenizer valve, it is also relatively economical to manufacture.

The present invention may be modified further without departing from the scope of the appended Claims.

What is claimed is:

1. A homogenizer valve used to homogenize liquid comprising:
   an axially extending valve housing having an interior, an inlet into which the liquid to be homogenized is introduced and an outlet from which the liquid exits the housing;
   a plurality of axially adjacent valve seats in the interior of the housing;
   a plurality of movable valve cones in the interior of the housing, the plurality of valve cones being mounted on a common movable rod so that movement of the rod results in corresponding movement of all of the plurality of valve cones, each valve cone cooperating with a respective one of the valve seats so that a respective throttle occurs between each valve cone and the respective valve seat, with each throttle constituting a homogenization gap so that a total number of homogenization gaps is equal to a total number of valve seats and so the total number of homogenization gaps is also equal to a total number of valve cones;
   each of the plurality of valve cones possessing an outer dimension greater than an inner dimension of the cooperating valve seat so that each of the plurality of valve cones and the associated valve seat radially overlap one another to define the homogenization gap; and
   wherein the common movable rod is a threaded rod and all of the plurality of valve cones threadably engage the threaded rod centrally disposed in the interior of the valve housing.

2. The homogenizer valve as claimed in claim 1, wherein the valve cones and the valve seats are rotation-symmetrical.

3. The homogenizer valve as claimed in claim 1, wherein the homogenization gaps are disposed at 20-45° in relation to a horizontal plane when the valve housing is vertically arranged.

4. The homogenizer valve as claimed in claim 1, wherein the outlet is located in a wall of the housing at a location between opposite ends of the housing.

5. The homogenizer valve as claimed in claim 1, wherein the common movable rod is connected to a piston which regulates the valve cones together with the common movable rod so that all the homogenization gaps always possess the same gap height h.

6. The homogenizer valve as claimed in claim 1, wherein the valve seats are secured to the valve housing.

7. The homogenizer valve as claimed in claim 1, wherein all of the plurality of axially adjacent valve seats are identical to each other; and
   wherein all of the plurality of movable valve cones in the interior of the housing are identical to each other.

8. A homogenizer valve comprising
   a plurality of pressurized, movable valve cones;
   a plurality of valve seats;
   a valve housing surrounding the valve cones and the valve seats;
   each of the valve cones being associated with a respective one of the valve seats so that a throttle occurs between each valve cone and the associated valve seat, constituting a homogenization gap;
   each of the valve cones possessing an outer dimension greater than an inner dimension of the associated valve seat so that each valve cone and the associated valve seat radially overlap one another to define the homogenization gap;
   wherein all of the plurality of pressurized, movable valve cones are identical to each other; and
   wherein all of the plurality of valve seats are identical to each other.

9. The homogenizer valve as claimed in claim 8, wherein valve cones and valve seats are rotation-symmetrical.

10. The homogenizer valve as claimed in claim 8, wherein the homogenization gaps are disposed at an angle in relation to the horizontal plane.

11. The homogenizer valve as claimed in claim 10, wherein the homogenization gaps are disposed at 20-45° in relation to the horizontal plane.

12. The homogenizer valve as claimed in claim 11, wherein the homogenization gaps are disposed at 30° in relation to the horizontal plane.

13. The homogenizer valve as claimed in claim 8, wherein the valve cones are threaded on a threaded rod centrally disposed in the valve housing.

14. The homogenizer valve as claimed in claim 13, wherein the valve cones are disposed such that they are regulated together with the threaded rod by means of a piston, so that all homogenization gaps always have the same gap height h.

15. The homogenizer valve as claimed in claim 8, wherein the valve seats are secured to the valve housing.

16. The homogenizer valve as claimed in claim 8, wherein the plurality of pressurized, movable valve cones are mounted on a common movable rod so that movement of the rod results in corresponding movement of all of the plurality of valve cones.

17. A homogenizer valve used to homogenize liquid comprising:
   an axially extending valve housing having an interior, an inlet into which the liquid to be homogenized is introduced and an outlet from which the liquid exits the housing;
   a plurality of axially adjacent valve seats in the interior of the housing;
   a plurality of movable valve cones in the interior of the housing, the plurality of valve cones being mounted on a common movable rod so that movement of the rod results in corresponding movement of all of the plurality of valve cones, each valve cone cooperating with a respective one of the valve seats so that a respective throttle occurs between each valve cone and the respective valve seat, with each throttle constituting a homogenization gap so that a total number of homogenization gaps is equal to a total number of valve seats and so the total number of homogenization gaps is also equal to a total number of valve cones;
   each of the plurality of valve cones possessing an outer dimension greater than an inner dimension of the cooperating valve seat so that each of the plurality of valve cones and the associated valve seat radially overlap one another to define the homogenization gap;
   wherein all of the plurality of axially adjacent valve seats are identical to each other; and
   wherein all of the plurality of movable valve cones in the interior of the housing are identical to each other.

* * * * *